US008208002B2

(12) United States Patent
Saleh et al.

(10) Patent No.: US 8,208,002 B2
(45) Date of Patent: Jun. 26, 2012

(54) DISTANCE LEARNING VIA INSTRUCTOR IMMERSION INTO REMOTE CLASSROOM

(75) Inventors: Youssef Saleh, Arlington, MA (US); Gopal Paripally, North Andover, MA (US); Marcio Macedo, Cambridge, MA (US)

(73) Assignee: Polycom, Inc., Pleasanton, CA (US)

( * ) Notice: Subject to any disclaimer, the term of this patent is extended or adjusted under 35 U.S.C. 154(b) by 530 days.

(21) Appl. No.: 12/549,234

(22) Filed: Aug. 27, 2009

(65) Prior Publication Data

US 2011/0050842 A1 Mar. 3, 2011

(51) Int. Cl.
*H04N 7/14* (2006.01)
(52) U.S. Cl. .................... 348/14.08; 348/14.01
(58) Field of Classification Search ...... 348/14.01–14.1, 348/14.16; 370/359, 360; 709/204; 434/350–352
See application file for complete search history.

(56) References Cited

U.S. PATENT DOCUMENTS

| 5,767,897 A * | 6/1998 | Howell ...................... 348/14.07 |
| 2010/0073454 A1 * | 3/2010 | Lovhaugen et al. ....... 348/14.03 |
| 2010/0279266 A1 * | 11/2010 | Laine et al. .................. 434/350 |

* cited by examiner

*Primary Examiner* — Tuan Nguyen
(74) *Attorney, Agent, or Firm* — Wong, Cabello, Lutsch, Rutherford & Brucculeri, L.L.P.

(57) ABSTRACT

A distance learning scenario includes a local classroom having a local videoconferencing device communicating with a remote videoconferencing device at a remote classroom. A first local camera captures images of the local participants, a second local camera captures images of an instructor, and a local display screen displays images of remote participants. At the remote location, a first remote camera captures images of remote participants, a first remote display screen displays images of local participants, and a second remote display screen displays images of the instructor. The local display screen is situated on a side of the local presenter that is substantially opposite to the side on which the first remote display screen is situated relative to the second remote display screen at the remote location to implement video-mirroring. The local and remote display screens display life-size images of the participants and the instructor.

30 Claims, 7 Drawing Sheets

DISTANCE LEARNING VIA INSTRUCTOR IMMERSION INTO REMOTE CLASSROOM

FIELD OF THE INVENTION

The present invention relates generally to videoconferencing systems, and more particularly to distance learning videoconferencing systems.

BACKGROUND

Distance education or learning involves education or training courses delivered to remote sites via audio, video (live or prerecorded), or computer technologies. Distance learning has obvious benefits in terms of outreach; however, conventional distance learning systems hinder effective interaction between the instructor, the local participants, and the remote participants. The lack of effective interaction between all the entities involved in distance learning can be caused by poor eye contact between the remote participants and the instructor/presenter and local participants, poor visual communication between the local and remote participants, poor aural communication between local and remote classrooms, etc.

Figure 1A:
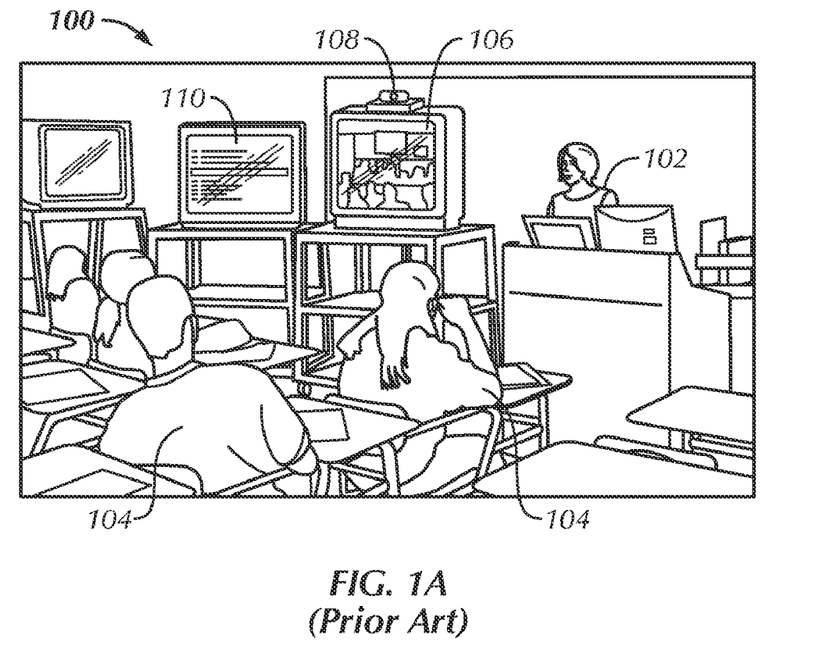
FIGS. 1A and 1B depict a traditional distance learning scenario.
Figure 1B:
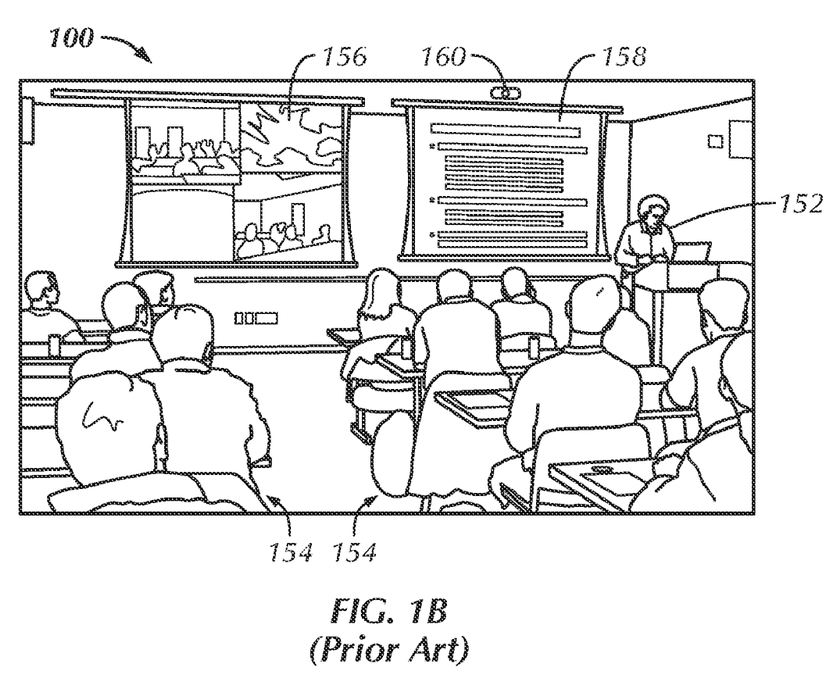

For example, FIGS. 1A and 1B depict a traditional distance learning scenario. A classroom 100 includes an instructor 102 facing a group of students or local participants 104. The classroom also includes a videoconferencing equipment 108 connected to a television monitor 106. Videoconferencing equipment 108 typically communicates with similar videoconferencing equipment placed at a remote location that includes remote participants. Both the local and remote videoconferencing equipments capture video and audio media at their respective locations and transmit the captured media to the opposite end. The videoconferencing equipment 108 shown in FIG. 1A includes a camera that captures the video and audio of the local participants 104 sitting in front of the camera and transmits such video and audio to the remote location, where it is displayed on the remote television monitor. Similarly, video and audio of the remote location participants is displayed on the local television monitor 106. The local videoconferencing equipment 108 also captures and transmits the voice of the instructor 102 standing adjacent to, and out of visual capture range of, the local videoconferencing equipment 108 to the remote location. The classroom 100 also includes an additional television monitor 110 that displays the presentation from the instructor's computer. The videoconferencing equipment 108 can also communicate the instructor's presentation onto a similar television monitor connected to the videoconferencing equipment at the remote location.

In the scenario depicted in FIG. 1A, the local participants 104 can see, hear, and interact with the instructor 102 and among each other easily. However, the interaction of the local participants 104 with remote participants seen and heard on the television monitor 106 is limited due to the video of all the local participants being confined to the small screen of the television monitor 106. Furthermore, the directionality of the audio reproduction heard by the local participants will be minimal—giving no perception of directionality of the source of audio from the remote location. The perceived interaction at the remote location is even more limited. Not only do the remote participants experience mutual lack of interactivity with the local participants, but they also lack any visual perception of the instructor 102. This is because although the local videoconferencing equipment 108 captures both audio and video of the local participants 104, it only captures the voice of the instructor 102. Furthermore, the instructor 102 only hears the voices of the remote participants reproduced by the television monitor 106, but is unable to see them.

FIG. 1B discloses another traditional distance learning scenario. Classroom 150 includes an instructor 152 carrying out a distance learning session with two remote participants, whose images are projected on screen 156. Camera 160 of the videoconferencing system, located on top of screen 158, captures the local participants 154 and the back of the instructor 152. Similar to the distance learning scenario depicted in FIG. 1A, the interaction between the remote and local participants shown in FIG. 1B is quite limited. In addition, the instructor can make direct eye-contact with only the local participants 154, and not the remote participants displayed on screen 156.

Figure 2:
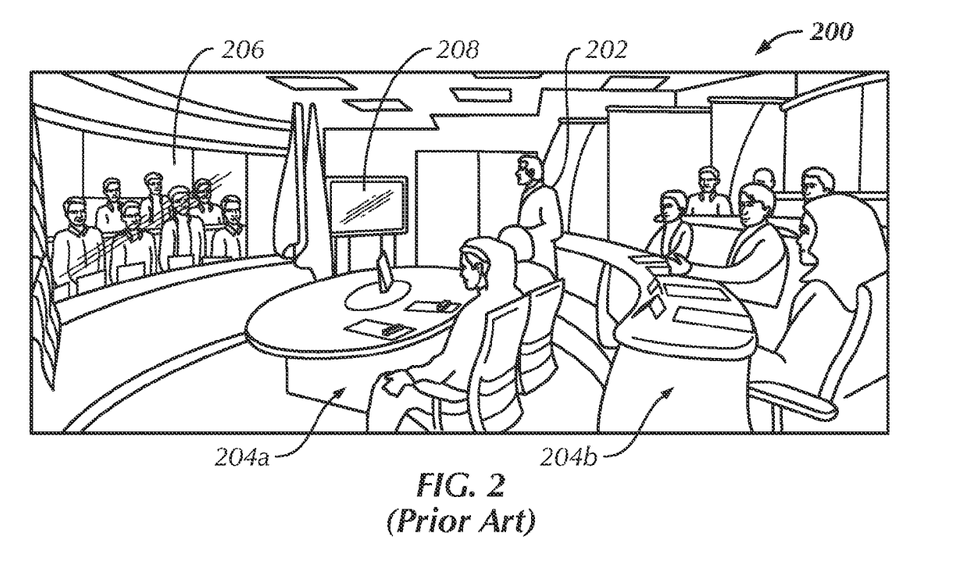
FIG. 2 illustrates another traditional distance learning scenario.

FIG. 2 discloses yet another distance learning scenario. The local classroom 200 includes an instructor 202 conducting a distance learning session with local participants 204a (sitting adjacent to the instructor 202) and 204b (sitting behind instructor 202) and remote participants on the display screen 206. Screen 208 displays educational data content, such as presentation slides, to the local participants 204a and 204b. In this case, the instructor 202 is able to make direct eye-to-eye contact with the remote participants, but has no visual perception of the local participants 204b that are sitting behind him.

In summary, traditional scenarios are plagued by poor eye-contact between the participants and the instructor and poor interaction between local and remote participants.

SUMMARY

A videoconferencing system for carrying out conferencing sessions, such as distance learning, between a local site and a remote site is disclosed. A local classroom can include one or more local participants and an instructor/presenter. Image capturing devices, such as cameras, can capture images of the local participants and the local instructor and transmit them to the remote classroom. The remote classroom can include a display screen for displaying received images of local participants, and an instructor display screen for displaying received images of the local instructor. Remote classroom can also include cameras for capturing images of remote participants and transmitting the images to the local classroom. The local classroom can include an image display device for displaying received images of remote participants.

The display devices can display life size images of the local participants and remote participants. The position of the instructor display screen and the display device for displaying images of local participants at the remote classroom are arranged such that they form a mirror image of the arrangement of the display screen and the instructor at the local classroom. Video-mirroring along with life size images of far-end participants allow for a highly interactive distance learning environment.

Both the camera that captures images of the instructor and the local participants can be situated within the same field of view of the instructor. In such an arrangement, when the instructor addresses the local participants, the remote participants can get the desired impression that the instructor is also directly addressing them. Because of video-mirroring, when the instructor turns to address the local participants, the image of the instructor at the remote classroom will also be seen to turn towards the images of the local participants at the remote classroom. Therefore, the remote participants get visual cues that are relatively consistent with those that would be perceived if the local participants and the instructor were actually at the remote classroom.

The local classroom and the remote classroom can include multiple display devices for displaying images of participants at the other end. Each of the multiple display devices can display life-size images. Voices of far-end participants can be directed to loudspeakers that are closest to the display device where the image of the respective participant is displayed.

The instructor can use presentation aids such as interactive white/black board, document camera, large computer monitors, projection screen, etc., for presenting additional material to the participants. The content shown on the presentation aids can be displayed to the remote participants on a separate display screen placed near the instructor or on personal display screens and laptops.

Instructor's captured image can be processed to extract only the portion of the image that contains the instructor and removing any background information. The processed image can be overlaid on a desired background and transmitted to the remote location where it is displayed to the remote participants.

More than one instructor/presenter can be present during the videoconferencing session. For example, the remote classroom can have an instructor in addition to the instructor at the local classroom. An additional instructor display screen can be placed at the local classroom on a side of the display screen displaying the remote participants that is opposite to the side on which the instructor is situated with respect to the display screen displaying images of local participants.

BRIEF DESCRIPTION OF THE DRAWINGS

Exemplary embodiments of the present invention will be more readily understood from reading the following description and by reference to the accompanying drawings, in which.

DETAILED DESCRIPTION

Figure 3:
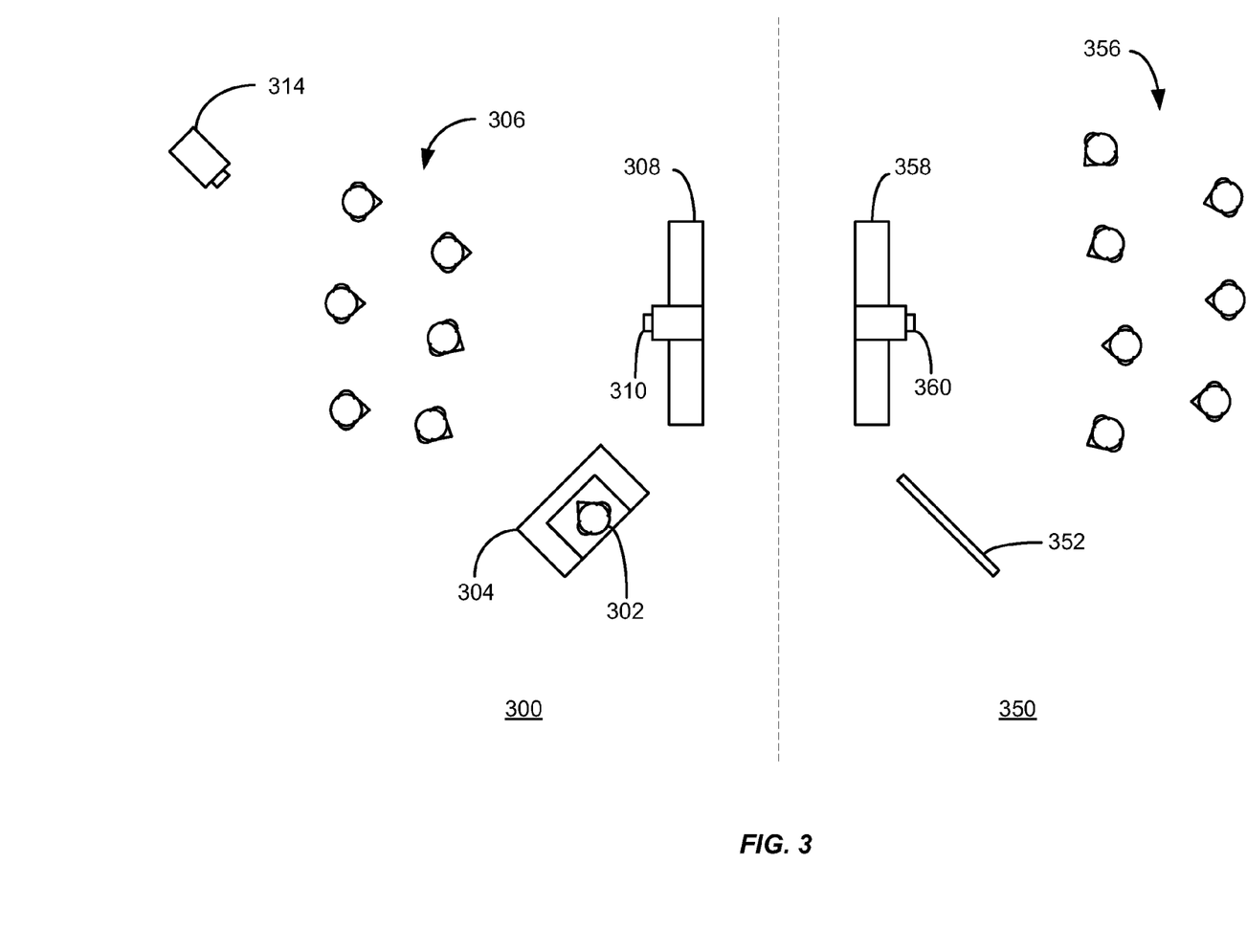
FIG. 3 shows the top view of a local and remote classroom engaged in distance learning.

FIG. 3 depicts a distance learning scenario with top views of local classroom 300 and remote classroom 350. The local classroom 300 can include an instructor 302 standing at a podium 304 conducting a class session with local participants 306. The instructor 302 can also conduct a distance learning session with remote participants 356 at the remote classroom 350. Although only one remote classroom is shown, the distance learning session may include additional remote classrooms. The images (e.g., video) and voices of the local participants can be captured by the local image and sound capturing device 310. Similarly, the images (e.g., video) and voices of the remote participants can be captured by the remote image and sound recording device 360. Image and sound capture devices 310 and 360 can include a camera (PTZ—Pan/Tilt/Zoom) based on analog (cathode ray tube) or digital technology (image sensors, such as charged coupled devices). Devices 310 and 360 can also have the capability of capturing images in high definition and 3-D. Sound can be captured in mono, stereo, or with multiple channels, and reproduced at the other end in the same or different format (e.g., capture sound in stereo and reproduce at the other end in mono, etc.).

The captured images and sound of the remote participants can be displayed to the local participants on a local image display device 308, while the captured images and sound of the local participants can be reproduced for the remote participants on the remote image display device 358. Display devices 308 and 358 can use analog or digital technology for image reproduction. These may include cathode ray tube televisions or flat screen LCD, Plasma, projection, etc. Although only one image display device is depicted in each of the local 300 and the remote 350 classrooms, additional image display devices can also be included.

Local classroom 300 can also include an instructor camera 314 that primarily captures the image of the instructor 302. The instructor camera 314 can be similar to the image and sound capture device 310, or can be of a different type. The instructor camera 314 can be mounted close to the ceiling so that it can capture a clear view of the instructor 302. However, the instructor camera 314 can also be placed at any location relative to the instructor 302 so long as it captures the instructor's image. The image of the instructor 302 captured by the instructor camera 314 is displayed on the instructor display screen 352 at the remote classroom 350. As a result, the remote participants 356 can see two separate views of the local classroom—one on display device 358 that displays images of local participants 306 and one on the display screen 352 that displays images of instructor 302.

Although not explicitly shown in FIG. 3, both the local classroom 300 and the remote classroom 350 include videoconferencing equipment that allows the two sites to communicate with each other. For example, the videoconferencing equipment can be Polycom HDX series and VSX series of conference devices. The video-conferencing devices can establish and control video-conferencing calls with the far-end. The video-conferencing devices can also control image and audio capturing devices within the respective classrooms. Each video-conferencing device can also include a codec, or coder-decoder for encoding and decoding information transmitted from and received at the video-conferencing device. Before transmission, the codec can convert analog signals to digital signals and then compresses the digital signals. The codec can also decompress incoming digital signals and convert them back into analog signals. In some cases where input signals are already in digital form, so converting from analog to digital signals may not be necessary. Codecs can process both audio and video signals. For example, audio codecs can include standard codecs such as, G.711, G.722, G.722.1, G.723.1, etc. Video codecs can include standard codecs such as, H.261 FCIF, H.263 QCIF, H.263 FCIF, H.261 QCIF, H.263 SQCIF, H.264, etc. Audio and video codecs can be implemented in hardware, software or a combination of hardware-software. The video-conferencing devices can also include an image processing engine to process incoming and outgoing video frames. The image processing engine can communicate with the codec, image capturing devices, and display devices.

Display device 358 and display screen 352 in the remote classroom can be placed in a manner that mirrors (video-mirroring) the location of the image and sound capture device 308 and the location of the instructor 302, respectively. By having a separate display screen 352 showing the instructor, the remote participants 356 can experience interacting with the instructor 302 in a way similar to the experience of the local participants 306. In other words, remote participants 356 viewing the display screen 352 will feel as if the instructor is present in the remote classroom 350. Because the instructor camera 314 can be placed in the instructor's field of view that also includes local participants 306, when the instructor 302 addresses the local participants 306 the remote participants 356 can get the desired perception that the instructor 302 is also directly addressing them. In addition, because the image display device 308, which displays images of the remote participants 356, can also be within the field of view of the instructor 302, the instructor can observe the actions of the remote participants 356. For example, the instructor 302 can respond to visual cues, such as one of the remote participants 356 raising his/her hand to get the instructor's attention.

Local participants 306 can view the image of remote participants 356 on the local image display device 308. Similarly, remote participants 356 can view local participants 306 on the remote image display device 358. Because of the video-mirror arrangement of the display screen 352, the visual cues of interaction perceived at both ends give a life-like distance learning experience. For example, when one or more local participants 306 want to address instructor 302, those local participants will turn to their right to make eye-contact with the instructor 302. The resulting image reproduced on the remote image display device 358 will show the local participants that are addressing the instructor 302 turning to the left of the remote participants 356. Because the display screen 352, on which the image of the instructor is shown, is also lying substantially to the left of the remote participants 356, the remote participants 356 get visual cues that are relatively consistent with those that the remote participants 356 would experience if they were actually sitting across from the local participants 306 in the same room. Similarly, local participants 306 will also receive realistically consistent visual cues from the image of remote participants 356 on the local image display screen 308.

Figure 4A:
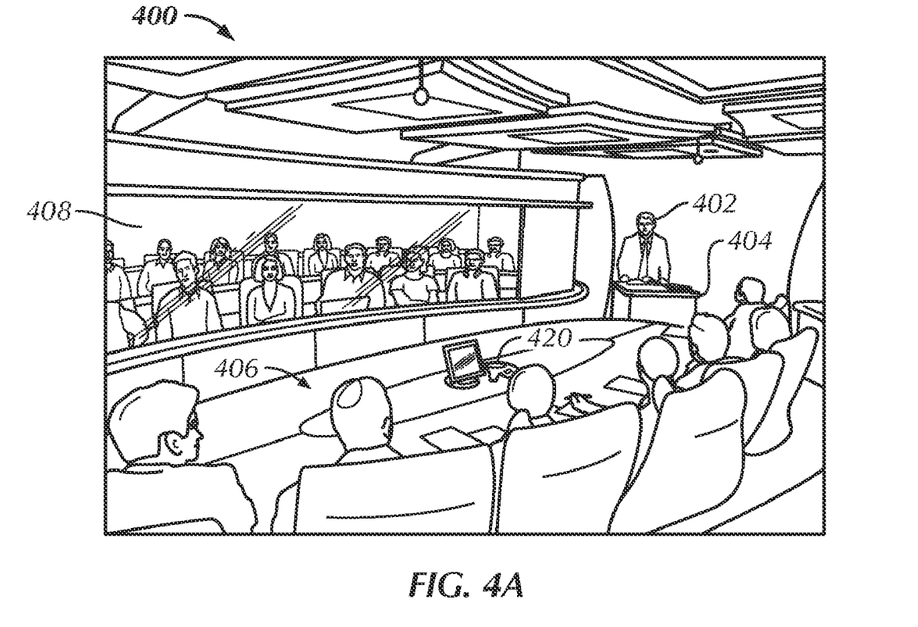
FIGS. 4A and 4B show a local and remote location engaged in distance learning along with and instructor.

FIG. 4A illustrates an ongoing distance learning session at local classroom 400 that includes an instructor 402 and local participants 406. Life-size images of remote participants can be displayed on the image display screen 408. The size of images of the remote participants can be chosen to be substantially equal to the size of the remote participants themselves, as they would appear to the local participants if the remote participants were actually present in the classroom in front of them. Consequently, other remote participants sitting further behind a front row of remote participants can appear smaller—consistent with a natural perspective view. The sizes may vary from the actual size of the remote participants, as long as the image size can be perceived to be of the size of an average person. The local participants can thus perceive a realistic presence of the remote participants in the local classroom.

Instructor 402 can be positioned behind the podium 404 from where he can address local participants 406, which are to his left, and observe the images of remote participants on the image display screen 408, which is to his right. The position of the instructor 402 is not limited to the one shown in FIG. 4A. For example, instructor 402 may be positioned on the opposite side of the image display screen 408 such that the local participants 406 are to his right.

An instructor camera (not shown) captures a video of the instructor 402. Image processing may be carried out on the captured video so that only the instructor's image and not the background is captured and transmitted to the remote classroom. For example, in one technique, the image processing engine can use algorithms for face detection within each frame of the instructor's video. Face detection algorithms can localize faces within an input image. Typically, a face detection system can include a set of classifiers that have been previously trained (using learning methods such as neural networks, etc.) to classify the input pattern associated with features such as a face or a non-face. A fixed size window can scan every location within an image and extract image patterns that can be passed through classifiers to check for existence of a face. Once a face is recognized, the regions in the image where the face exists can be monitored for movement for tracking the face. The pixels associated with the detected face of the instructor 302 can be extracted from the surrounding patterns in the image, and overlaid on a more desirable background. The composite image including the instructor's 302 face and the desired background can be transmitted to a remote classroom to be displayed on a remote display screen. The composite image can also include the instructor's 302 torso if desired.

Other techniques, such as chroma keying, matte, etc., can also be employed. For example, in chroma keying the instructor can be made to present in front of a monochromatic (typically, blue or green) background. After the image is captured by the image capturing devices, the image processing engine can replace all pixels representing the monochromatic background with a desired background image to form a composite image for transmission to a remote classroom. Additionally, or alternatively, Time of Flight (TOF) cameras can by employed for determining distance data related to the instructor and the background. A TOF camera can capture distance information of the source of light associated with each pixel. Therefore, information from the TOF camera can be used to capture the pixel information associated with the instructor only. All pixel information associated with the background, which are at a distance that is greater that the distance of the instructor, can be removed. The extracted image of the instructor can then be overlaid on a desired background to form the composite image that is transmitted to the remote classroom.

Images and voices of the local participants can also be captured via local image and sound capture devices (not shown). The local image and sound capture devices can be placed in such a way that they are hidden from the local participants. In addition, more than one image and sound capture devices can be employed to capture a wider view of the local participants and their surroundings. For example, a microphone array can be used to capture the voices of participants and determine their respective positions. This position data can then be transmitted to the far-end, which in turn, can activate the appropriate loudspeaker based on the position of the image of a participant. The microphone array can include a series of spaced microphones that can be arranged horizontally, vertically, or in combination. Typically, at least one of the microphones in the array can be assigned as a reference microphone. A number of candidate locations can be predetermined where the distance of the candidate locations from each of the microphones is known. Acoustic signals captured by each of the microphones can be delayed with respect to the acoustic signal captured by the reference microphone. This delay can be, in part, a function of a candidate source location and microphone location with respect to the reference microphone. Signal energies of each of the delayed signals associated with each candidate location can then be determined. Subsequently, the candidate location associated with the highest signal energy can be selected as the location that best estimates the actual location of the audio source. In other words, using maximum likelihood estimation, a predetermined candidate source that is likely to be the best estimate of the actual location of the audio source can be selected as the location of the audio source. Clearly, the accuracy of the estimation can improve with an increase in the number and spatial distribution of the candidate locations. For example, 61 candidate locations can be used at an approximate radial distance of 10 feet from the microphones. More details on determining locations of participants using microphone arrays are disclosed in commonly assigned U.S. Pat. No. 6,912,178 entitled "System and method for computing a location of an acoustic source," by Chu et al., and is hereby incorporated by reference.

Typically, the relative distance between the microphones and the image capturing device is fixed or is a known value. Therefore, the estimated position of the audio source described with respect to the microphones can be easily transformed to be described with respect to the image capturing device. Therefore, with the knowledge of the pan, zoom and tilt values of the image capturing device, the position of the audio source on the image captured by the image capturing device can be determined. The information of the position of the audio source on a captured image can be transmitted to the codec at the far end. The far end codec can use this information to determine the approximate position of the audio source on the display screen. If multiple loudspeakers are included at the far end, the codec can direct the sound associated with the current speaker to a loudspeaker, or an audio channel associated with the loudspeaker, that is nearest to the image of the current speaker on the display screen. For example, if the far end includes two loudspeakers placed on the left and the right corners of the room, then the codec can manipulate the relative phase and amplitude of the audio signal fed to the two loudspeakers based on the position of the audio source (a local participant, for example) on the display screen. As a result, the perceived source of voice at the far end can follow the position of the image of the currently speaking local participant on the display screen.

Figure 4B:
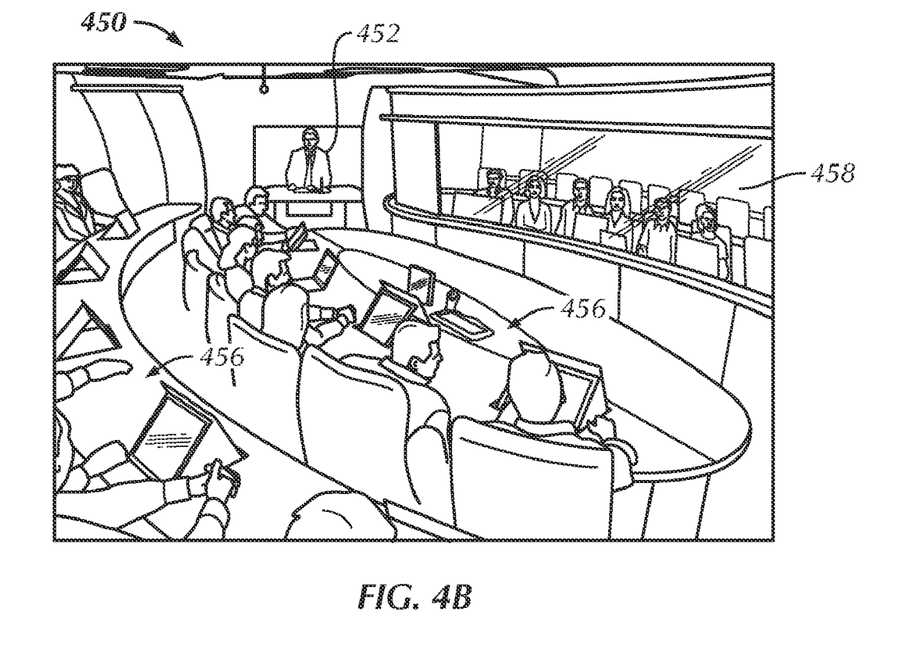

FIG. 4B illustrates a remote classroom 450 including remote participants 456. The image of instructor 402 can be displayed on display screen 452, which, for example, can be placed on the left of the remote participants 456. The image of instructor 402 captured at the local classroom 400 can be altered to a life-size image that can be shown on the remote display screen 452. A loudspeaker, primarily reproducing the voice of instructor 402, can also be placed in the vicinity of the display screen. The life-size image of the instructor 402 on the display screen 452 combined with the directional sound can give a feeling of immersion of the instructor 402 in the remote classroom 450. The remote participants 456 can now make direct eye contact with the instructor's image on the display screen 452—further enhancing the distance learning experience.

Both the local participants 406 and the remote participants 456 can see each other's images on the image display screens 408 and 458 directly in front of them. The life-size images and multichannel sound reproduction, can give the participants visual and aural clues that they experience in real life. For example, the voice of a local participant can emanate from a loudspeaker that is near the portion of the display screen 458 where the local participant's image is being displayed. Because of the video-mirroring effect, when a remote participant turns to address the instructor or the image of the instructor, remote participants will see the image of the far-end participant turning in the direction of the instructor or the image of the instructor.

Figure 5:
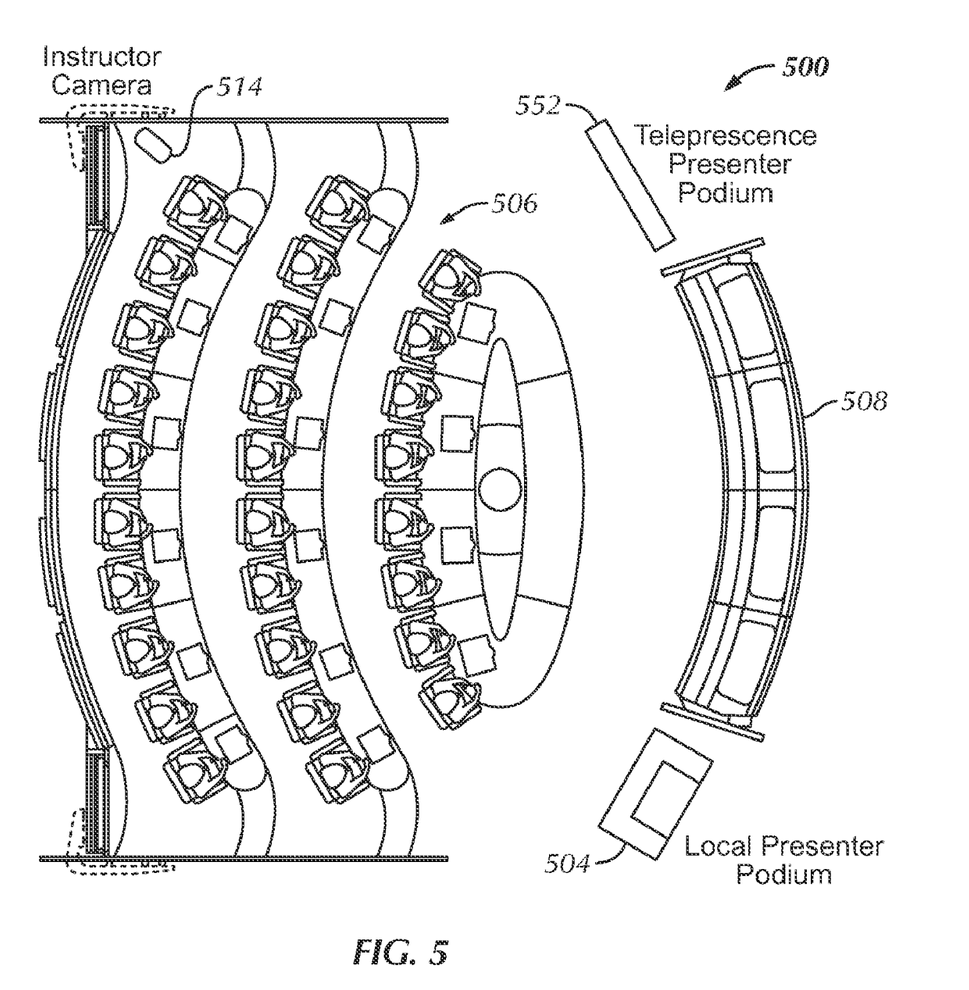
FIG. 5 shows the top view of an exemplar classroom for distance learning.

FIG. 5 illustrates a top view of a classroom that can be used for a distance learning session. The classroom 500 can include an instructor 502 standing behind an instructor's podium 504 conducting a distance learning session with local participants 506 and remote participants that are displayed on a set of 4 image display screens 508. The classroom 500 can also include an instructor camera 514 pointed at the instructor 502. Images captured by the instructor camera can be transmitted to a remote classroom (not shown). The classroom 500 can also include image and sound capture devices (not shown) that are hidden from the local participants 506. These hidden image and sound capture devices can be placed behind the image display screens 508.

Classroom 500 can further include a display screen 552 that can display a life-size image of an additional instructor or presenter at the remote location. This allows immersion of a presenter/instructor from the remote classroom into the local classroom while at the same time having a local presenter/instructor. Visual and aural cues that produce realistic experience for the participants are still preserved even with more than one instructor. For example, local participants turning to their left to address the image of the remote presenter/classroom on the display screen 552 will be seen on the remote display screen as turning to the right of the remote participants, which is where the remote presenter/instructor is positioned.

Figure 6:
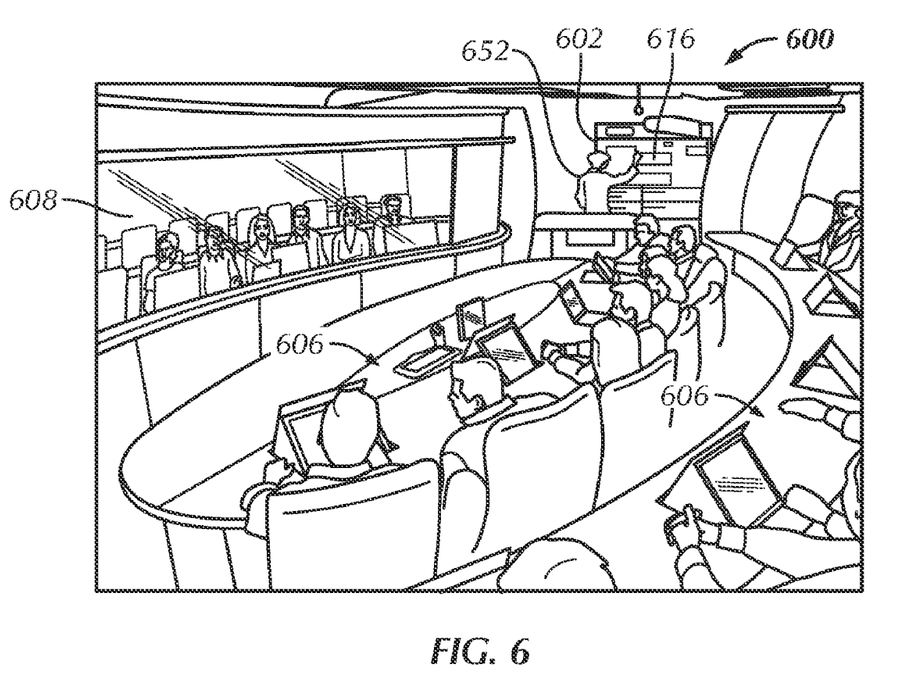
FIG. 6 depicts a local classroom engaged in distance learning with the instructor presenting educational material.

FIG. 6 shows an instructor 602 conducting a distance learning session from a local classroom 600. The local classroom 600 can include local participants 606 and a set of image display screens 608 displaying remote participants. Instructor 602 can employ teaching methods such as a black/whiteboard, presentation screen, touch-screen, etc., for presentation of educational material. For example, in FIG. 6, instructor 602 can use a touch sensitive monitor 616 that is also capable of allowing the instructor to use the screen as an electronic writing board. The content displayed on the touch sensitive monitor can also be displayed on pop-up personal content displays 618, or laptops 620 positioned in front of the local participants. The personal content displays 618 and laptops 620 may include touch sensitive screens for accepting inputs from the local participants. Similar content can be displayed to the remote participants on their remote personal content displays, which may also be touch-sensitive or incorporate other input technologies and user interfaces to facilitate interaction between the participants.

Figure 7:
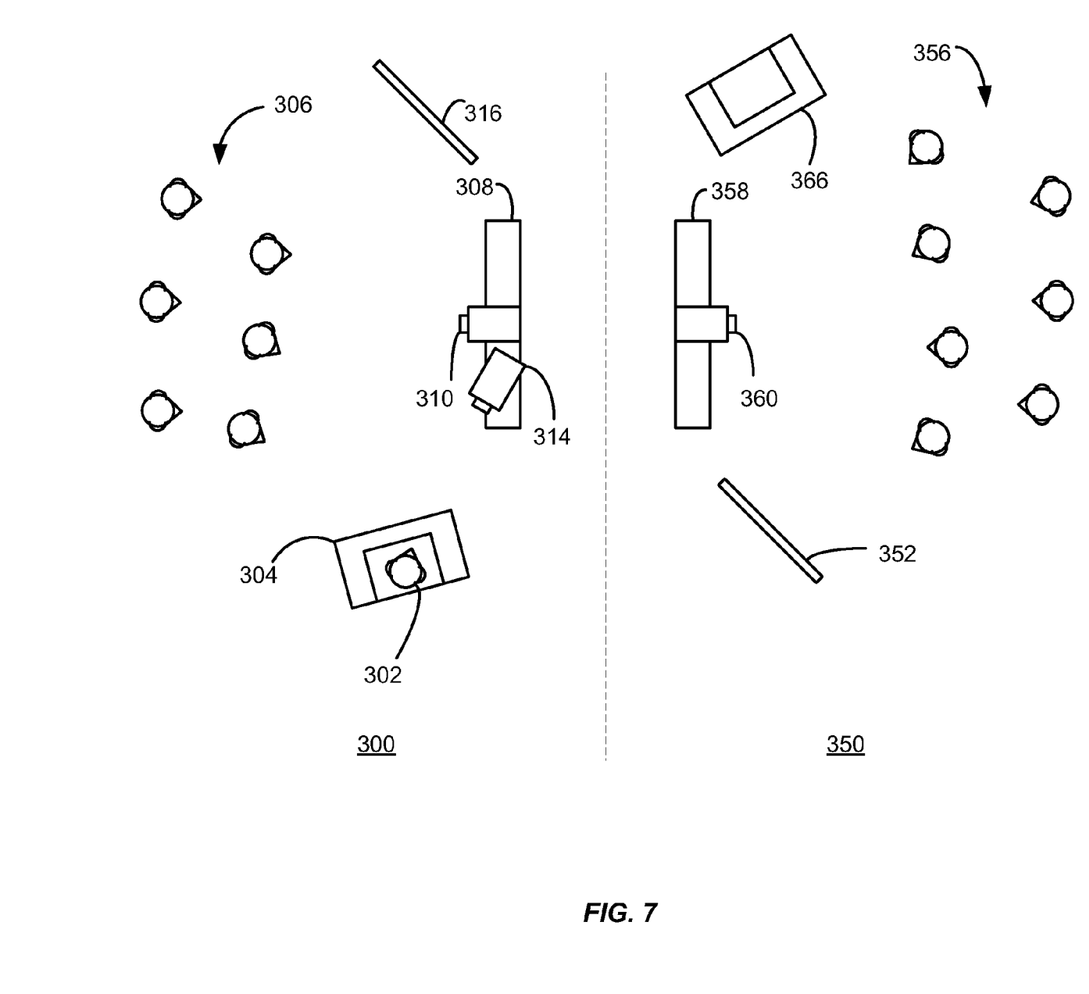
FIG. 7 shows the top view of a local and remote classroom engaged in distance learning with the instructor camera is located on or near the image display screen.

FIG. 7 illustrates an example where the instructor camera 314 can be located near the local image display device 308, on which the images of the remote participants 356 is displayed. The positioning of the instructors camera 314 near the local image display device 308 can provide additional visual cues that make the distance learning experience more realistic. For example, the instructor 302 will turn to his/her left to address the local participants, while turn to his/her right to address the remote participant's images displayed on the local image display device 308. As a result of video-mirroring, the remote display screen 352 will show the instructor turning to the right of the remote participants 356 while addressing the local participants (i.e., turning toward the images of local participants displayed on remote display screen 358) and turning towards and making direct eye-contact with the remote participants 356 when addressing the images of the remote participants on the local image display device 308.

FIG. 7, also shows an instructor display screen 316 present at the local classroom 300. The instructor display screen 316 displays received images of an instructor present at the remote classroom 350. In addition, the remote classroom can include an instructor's podium 366 where a remote instructor can address the remote participants 356. Although not shown in FIG. 7, an instructor camera can be located either at the remote display device 358 (similar to the local instructor camera 314) or can be placed at the location shown in FIGS. 3 and 5.

All the examples described herein are not limited to distance learning. A person skilled in the art will appreciate that the concepts presented above are equally applicable to executive and board meetings, training, project management, etc.

The above description is illustrative and not restrictive. Many variations of the invention will become apparent to those skilled in the art upon review of this disclosure. The scope of the invention should therefore be determined not with reference to the above description, but instead with reference to the appended claims along with their full scope of equivalents.

What is claimed is:

1. A videoconferencing system operable to communicate with a remote location, comprising:
   at least one camera positioned to capture an image of one or more local participants;
   a second camera positioned to capture an image of a local presenter;
   at least one local codec configured to encode and transmit the captured image of one or more local participants and the captured image of the local presenter to a remote location and decode received images from the remote location; and
   a first local display configured to display a received and decoded image of one or more remote participants at the remote location,
   wherein the first local display is situated on a side of the local presenter that is opposite the one or more local participants.

2. The videoconferencing system of claim 1, further comprising:
   a second local display configured to display a received and decoded image of a remote presenter at the remote location,
   wherein the second local display is situated on a side of the first local display that is opposite the local presenter.

3. The videoconferencing system of claim 1, wherein the second camera is placed within the field of view of the local presenter.

4. The videoconferencing system of claim 1, wherein the second camera is situated at the location of the first local display.

5. The videoconferencing system of claim 2, wherein the first local display and the second local display are configured to display the image of the one or more remote participants and the image of the remote presenter substantially equal in size to the size of the one or more remote participants and the remote presenter, respectively.

6. The videoconferencing system of claim 1, wherein the at least one local codec is configured to determine an estimated position of the one or more local participants in the transmitted image of the one or more local participants based on acoustic input from the one or more local participants, and to transmit the estimated position of the one or more local participants to the remote location.

7. The videoconferencing system of claim 1, wherein the at least one local codec is configured to decode received estimated position information of at least one remote participant within the received image of the one or more remote participants and direct sound associated with the at least one remote participant to at least one loudspeaker that is closest to the estimated position of the at least one remote participant.

8. The videoconferencing system of claim 1, further comprising a local writing board, wherein the at least one local codec is configured to encode and transmit contents of the local writing board to the remote location.

9. The videoconferencing system of claim 1, further comprising personal content displays to display contents of a remote white board received from the remote location.

10. The videoconferencing system of claim 1, further comprising:
    an image processing engine configured to extracting a portion of the captured image of the local presenter associated with the body of the local presenter and overlaying the extracted portion on a background image to form a processed image of the local presenter,
    wherein the at least one local codec is configured to encode and transmit the processed image of the local presenter to the remote location.

11. A videoconferencing system operable to communicate with a remote location having one or more remote participants, comprising:
    at least one camera positioned to capture an image of one or more local participants;
    at least one local codec configured to encode and transmit the captured image of one or more local participants to a remote location and decode a received image of one or more remote participants and a remote presenter from the remote location;
    a first local display configured to display the received and decoded image of the one or more remote participants; and
    a second local display configured to display the received and decoded image of the remote presenter;
    wherein the first local display is situated on a side of the second local display that is opposite the one or more local participants.

12. The videoconferencing system of claim 11, further comprising a second camera positioned to capture an image of a local presenter,
    wherein the at least one local codec is configured to encode and transmit the captured image the local presenter to the remote location, and
    wherein the local presenter is situated on a side of the first display that is opposite the second local display.

13. The videoconferencing system of claim 12, wherein the second camera is placed within the field of view of the local presenter.

14. The videoconferencing system of claim 12, wherein the second camera is situated at the location of the first local display.

15. The videoconferencing system of claim 11, wherein the first local display and the second local display are configured to display the image of at least one remote participant and the image of the remote presenter substantially equal in size to the size of the at least one remote participant and the remote presenter, respectively.

16. The videoconferencing system of claim 11, wherein the at least one local codec is configured to determine an estimated position of the one or more local participants in the transmitted images of the one or more local participants based on acoustic input from the one or more local participants, and to transmit the estimated position of the one or more local participants to the remote location.

17. The videoconferencing system of claim 11, wherein the at least one local codec is configured to decode estimated position information of at least one remote participant within the received image of one or more remote participants and direct sound associated with the at least one remote participant to at least one loudspeaker that is closest to the estimated position of the at least one remote participant.

18. The videoconferencing system of claim 11, further comprising a local writing board, wherein the at least one local codec is configured to encode and transmit contents of the local writing board to the remote location.

19. The videoconferencing system of claim 11, further comprising personal content displays to display contents of a remote white board received from the remote location.

20. The videoconferencing system of claim 12, further comprising:
    an image processing engine configured to extracting a portion of the captured image of the local presenter associated with the body of the local presenter and overlaying the extracted portion on a background image to form a processed image of the local presenter,
    wherein the at least one local codec is configured to encode and transmit the processed image of the local presenter to the remote location.

21. A method for conducting a videoconferencing session between a videoconferencing system at a local location and a videoconferencing system at a remote location, comprising:
    capturing images of local participants;
    capturing images of a local presenter;
    transmitting the images of the local participants and the local presenter to the remote location;
    receiving images of remote participants from the remote location; and
    displaying images of remote participants on a first local display,
    wherein the first local display is situated on a side of the local presenter that is opposite the one or more local participants.

22. The method of claim 21, further comprising:
    receiving and displaying images a remote presenter on a second local display,
    wherein the second local display is situated on a side of the first local display that is opposite the local presenter.

23. The method of claim 22, wherein displaying images comprises displaying an image of at least one remote participant that is substantially equal in size to the size of the at least one remote participant.

24. The method of claim 21, further comprising capturing and transmitting images of a local white board to the remote location.

25. The method of claim 21, further comprising receiving and displaying images of a remote white board on one or more local personal displays.

26. The method of claim 25, further comprising providing a user interface on the one or more local personal displays, wherein the one or more local personal displays have touchscreens.

27. The method of claim 21, further comprising determining and transmitting an estimated position of one or more local participants within the transmitted images of the local participants based on acoustic input from the one or more local participants.

28. The method of claim 21, further comprising:
    receiving an estimated position of one or more remote participants within the received images of the remote participants; and
    directing a received audio signal associated with the one or more remote participants to one or more loudspeakers closest to the estimated position.

29. The method of claim 21, further comprising:
    processing the captured images of the local presenter by extracting a portion of the captured images of the local presenter associated with the body of the local presenter and overlaying the extracted portion on a background image to form processed images of the local presenter; and
    transmitting processed images of the local presenter to the remote location.

30. The method of claim 29, wherein the extracting is carried out using face recognition techniques.

* * * * *